United States Patent [19]

Auld

[11] Patent Number: 5,502,494
[45] Date of Patent: Mar. 26, 1996

[54] MANAGEMENT OF CHANNEL BUFFER IN VIDEO DECODERS

[75] Inventor: David R. Auld, San Jose, Calif.

[73] Assignee: LSI Logic Corporation, Milpitas, Calif.

[21] Appl. No.: 402,708

[22] Filed: Mar. 13, 1995

Related U.S. Application Data

[63] Continuation of Ser. No. 143,198, Oct. 25, 1993, Pat. No. 5,398,072.
[51] Int. Cl.$^6$ ........................................... H04N 7/50
[52] U.S. Cl. ............................................. 348/426; 348/402
[58] Field of Search ............................... 348/400, 402, 348/415, 416, 426, 419; H04N 7/50

[56] References Cited

U.S. PATENT DOCUMENTS

| | | | |
|---|---|---|---|
| 5,148,272 | 9/1992 | Acampora et al. | 348/397 |
| 5,283,646 | 2/1994 | Bruder | 348/420 |
| 5,379,356 | 1/1995 | Purcell et al. | 348/416 |
| 5,398,072 | 3/1995 | Auld | 348/426 |

*Primary Examiner*—James J. Groody
*Assistant Examiner*—Jeffrey S. Murrell
*Attorney, Agent, or Firm*—Poms, Smith, Lande & Rose

[57] ABSTRACT

A novel channel buffer management scheme for a video decoder minimizes the amount of memory allocated to buffer a video bitstream received from a transmission channel. A channel buffer accumulates picture data encoded in a video bitstream received from a fixed rate channel. Picture data is read out of the channel buffer by a video decoder immediately after a predetermined or expected amount of bitstream data is received by the channel buffer. Picture decoding, reconstructing, and displaying operations are synchronized to permit the transfer of picture data from the channel buffer to the decoder whenever all of the data bits comprising a picture are received in the channel buffer. A microcontroller monitors and regulates the operation of the novel channel buffer management scheme to avoid overflow or underflow of bitstream data in the channel buffer. In accordance with one aspect of the present invention, a display controller and picture reconstruction means are fabricated as an monolithic integrated circuit device.

14 Claims, 3 Drawing Sheets

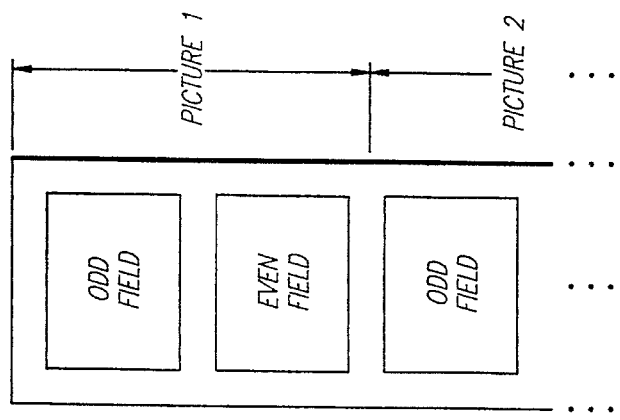
FIG. 6
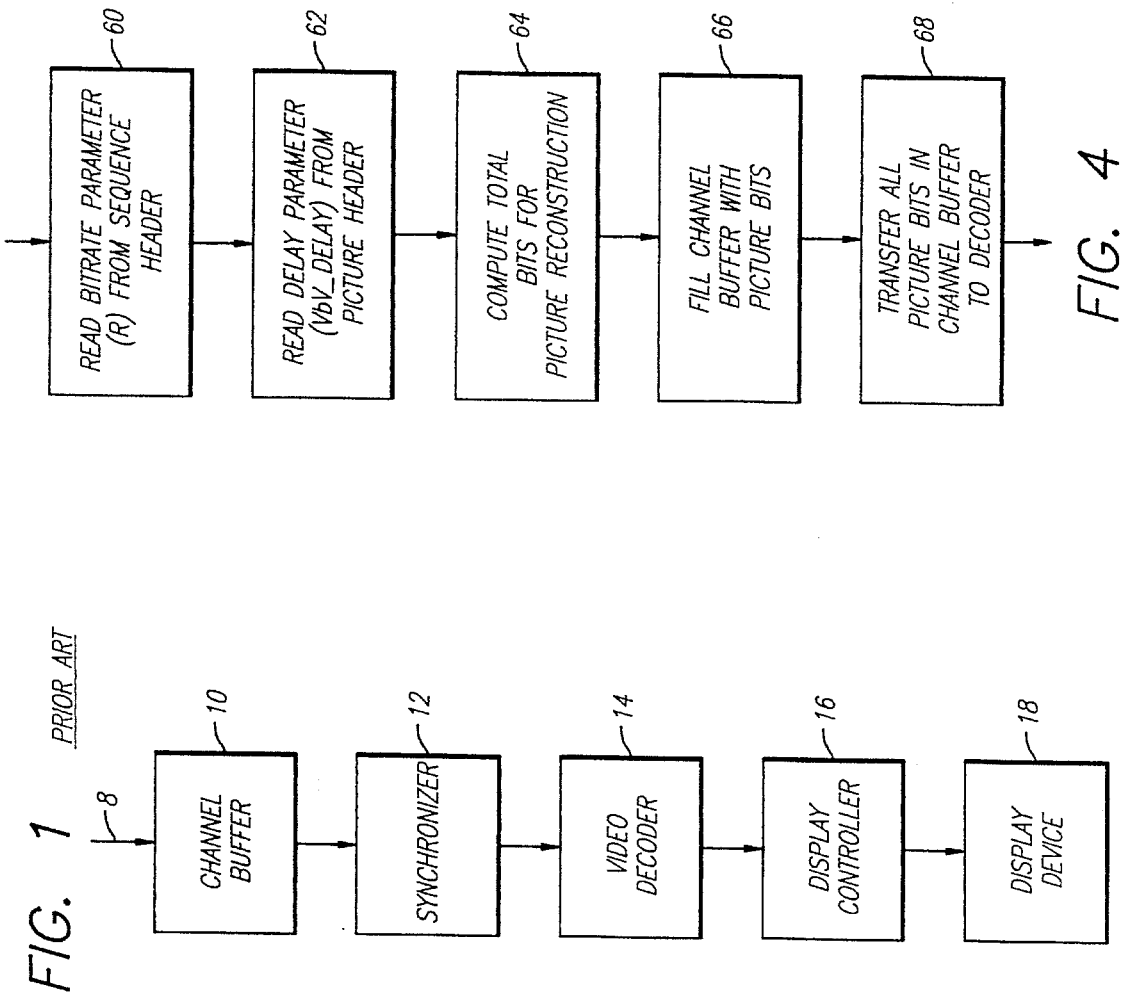
FIG. 4
FIG. 1 PRIOR ART

MANAGEMENT OF CHANNEL BUFFER IN VIDEO DECODERS

This is a continuation of U.S. patent application Ser. No. 08/143,198 filed Oct. 25, 1993, now U.S. Pat. No. 5,398,072, issued Mar. 14, 1995.

FIELD OF THE INVENTION

The present invention relates generally to digital video data, and, more particularly, to an apparatus and method for channel buffer management in a digital video decoder.

BACKGROUND OF THE INVENTION

In the communications industry, much attention has been focused on making more effective use of the limited number of transmission channels currently available for delivering video information and programming to an end user, such as a home viewer of cable television. Various methodologies have thus been developed to achieve the effect of an increase in the number of transmission channels that can be broadcast within the frequency bandwidth that is currently allocated to a single video transmission channel. An increase in the number of available transmission channels would allow the communications industry to reduce costs and to increase broadcast capacity. It has been estimated that a typical cable operator could have the capability to deliver as many as 500 channels to a home viewer.

A dramatic increase in the number of separate channels that could be broadcast with the currently available transmission bandwidth may be realized by employing a process for compressing and decompressing video signals. Typically, the video program signal is converted to a digital format compressed and encoded in accordance with an established compression algorithm or methodology. This compressed digital system signal, or bitstream, which includes a video portion, an audio portion, and other informational portions, is then transmitted to a receiver. Transmission may be over existing television channels, cable television channels, satellite communication channels, and the like. A decoder is then typically employed at the receiver to decompress and decode the received system signal in accordance with the same compression algorithm previously mentioned. The decoded video information may then be output to a display device, such as a television monitor.

VIDEO ENCODING

Video compression and encoding is typically performed by a video encoder. The video encoder normally implements a selected data compression algorithm that conforms to a recognized standard or specification agreed to among the senders and receivers of digital video signals. One such emerging standard developed by the Moving Pictures Experts Group, is generally referred to as the MPEG International Standard DIS 11172. TheMPEG standard defines a format for compressed digital video which supports data rates of about 1 to 1.8 megabits per second, resolutions of about 352 pixels (picture elements) horizontally to about 288 lines vertically, picture rates of about 24 to 30 pictures per second, and several VCR-like viewing options such as Normal Forward, Play, Slow Forward, Fast Forward, Fast Reverse, and Freeze.

In order to compress a video signal, it is typically necessary to sample the analog data and represent this data with digital values of luminance and color difference. The MPEG standard specifies that a luminance component (Y) of a video signal be sampled with respect to a color difference signals (Cr,Cb) by a ratio of two-to-one (2:1). That is, for every two samples of the luminance component Y, there should be one sub-sample each of the color difference components Cr and Cb. It is currently believed that the 2:1 sampling ratio is appropriate because the human eye is much more sensitive to luminance (brightness) components than to color components. Video sampling typically is performed in both the vertical and horizontal directions. Once the video signal is sampled, it is reformatted, for example, into a non-interlaced signal. An interlaced signal is one that contains only part of the picture content (i.e. every other horizontal line) for each complete display scan. A non-interlaced signal, in contrast, is one that contains all of the picture content. After a video signal is sampled and reformatted, the encoder may process it further by converting it to a different resolution in accordance with the image area to be displayed. In doing so, the encoder must determine which type of picture is to be encoded. A picture may be considered as corresponding to a single frame of motion video, or to a frame of movie film. However, different types of picture types may be employed for digital video transmission. The most prevalent picture types are: I-Pictures (Intra-Coded Pictures) which are coded without reference to any other pictures and are often referred to as anchor frames; P-Pictures (Predictive-Coded Pictures) which are coded using motion-compensated prediction from the past I- or P-reference picture, and may also be considered anchor frames; and B-Pictures (Bi-directionally Predictive-Coded Pictures) which are coded using motion compensation from a previous and a future I- or P-Picture.

A typical coding scheme may employ a mixture of I-, P-, and B-Pictures. Typically, an I-Picture may occur every half a second, with two B-Pictures inserted between each pair of I- or P-Pictures. I-Pictures provide random access points within the coded sequence of pictures where decoding can begin, but are coded with only a moderate degree of compression. P-Pictures are coded more efficiently using motion compensated prediction from a past I- or P-Picture and are generally used as a reference for further prediction. B-Pictures provide the highest degree of compression but require both past and future reference pictures for motion compensation. B-Pictures are generally not used as references for prediction. The organization of the three picture types in a particular video sequence is very flexible. A fourth picture type is defined by the MPEG standard as a D-Picture, or DC-Picture, which is provided to allow a simple, but limited quality, Fast-Forward mode.

Once the picture types have been defined, the encoder may estimate motion vectors for each 16×16 macroblock in a picture. A macroblock consists of a 16-pixel by 16-line section of the luminance component (Y) and two spatially corresponding 8-pixel by 8-line sections, one for each chrominance component Cr and Cb. Motion vectors provide displacement information between a current picture and a previously stored picture. P-Pictures use motion compensation to exploit temporal redundancy, or lack of motion, between picture frames in the video. Apparent motion between sequential pictures is caused by pixels in a previous picture occupying different positions with respect to the pixels in a current macroblock. This displacement between pixels in a previous and a current macroblock is represented by motion vectors encoded in the MPEG bitstream. Typically, the encoder chooses which picture type is to be used for each given frame. Having defined the picture type, the encoder then estimates motion vectors for each 16×16 macroblock in the picture. Typically in P-Pictures, one vector is employed for each macroblock, and in B-Pictures, one or two vectors are used. When the encoder processes B-Pictures, it usually re-orders the picture sequence so that a video decoder receiving the digital video signal operates properly. Since B-Pictures are usually coded using motion compensation based on previously sent I- or P-Pictures, the B-Pictures can only be decoded after the subsequent reference pictures (an I- or P-Picture) has been decoded. Thus, the sequence of the series of pictures may be re-ordered by the encoder so that the pictures arrive at the decoder in a proper sequence for decoding of the video signal. The decoder may then re-order the pictures in proper sequence for viewing.

As mentioned previously, a macroblock is a 16×16 region of video data, corresponding to 16 pixels in the horizontal direction and 16 display lines in the vertical direction. When sampling is performed by the video encoder, every luminance component (Y) of every pixel in the horizontal direction is captured, and every luminance component of every line in the vertical direction is captured. However, only every other Cb and Cr chrominance component is similarly captured. The result is a 16×16 block of luminance components and two 8×8 blocks each of Cr and Cb components. Each macroblock of video data thus consists of a total of six 8×8 blocks (four 8×8 luminance blocks, one 8×8 Cr block, and one 8×8 Cb block). The spatial picture area covered by four 8'8 blocks of luminance occupies an area equivalent to the region covered by each of the 8×8 chrominance blocks. Since there are half as many chrominance samples needed to cover the same area, they fit into an 8×8 block instead of a 16×16 block.

For a given macroblock of video data, the encoder is programmed to select a coding mode depending on the picture type, the effectiveness of motion compensation in the particular region of the picture, and the nature of the signal within the block. After the coding method is selected, the encoder performs a motion-compensated prediction of the block contents based on past and/or future reference pictures. The encoder then produces an error signal by subtracting the prediction from the actual data in the current macroblock. The error signal is similarly separated into 8×8 blocks (four luminance blocks and two chrominance blocks). A Discrete Cosine Transform (DCT) may then be performed on each block to achieve further compression. The DCT operation converts an 8×8 block of pixel values to an 8×8 matrix of horizontal and vertical coefficients of spatial frequency. Coefficients representing one or more non-zero horizontal or non-zero vertical spatial frequencies are called AC coefficients. An 8×8 block of pixel values can subsequently be reconstructed by a video decoder performing an Inverse Discrete Cosine Transform (IDCT) on the spatial frequency coefficients.

Additional compression is provided through predictive coding since the difference in the average value of neighboring 8×8 blocks tends to be relatively small. Predictive coding is a technique employed to improve compression based on the blocks of pixel information previously operated on by an encoder. A prediction of the pixel values for a block yet to be encoded may be performed by the encoder. The difference between the predicted and actual pixel values may then be computed and encoded. The different valves represent prediction errors which may later be used by a video decoder to correct the information of a predicted block of pixel values.

In addition to the signal compression that is achieved by the encoding process itself, a substantial degree of intentional signal compression is achieved by a process of selecting a quantization step size, where the quantization intervals or steps are identified by an index. The quantization level of frequency coefficients corresponding to the higher spatial frequencies favors the creation of coefficient values of zero by choosing an appropriate quantization step size in which the human visual perception system is unlikely to notice the loss of a particular spatial frequency unless the coefficient value for that spatial frequency rises above the particular quantization level chosen. The statistical encoding of the expected runs of consecutive zeroed-valued coefficients corresponding to the higher-order coefficients accounts for considerable compression gain.

In order to cluster non-zero coefficients early in the series and to encode as many zero coefficients as possible following the last non-zero coefficient in the ordering, the coefficient sequence is organized in a specified orientation termed zigzag ordering. Zigzag ordering concentrates the highest spatial frequencies at the end of the series. Once the zigzag ordering has been performed, the encoder typically performs "run-length coding" on the AC coefficients. This process reduces each 8'8 block of DCT coefficients to a number of events represented by a non-zero coefficient and the number of preceding zero coefficients. Because the high-frequency coefficients are more likely to be zero, run-length coding results in additional video compression.

The encoder may then perform Variable-Length Coding (VLC) on the resulting data. VLC is a reversible procedure for coding data that assigns shorter code words to frequent events and longer code words to less frequent events, thereby achieving additional video compression. Huffman encoding is a particularly well-known form of VLC that reduces the number of bits necessary to represent a data set without losing any information. The final compressed video data is then ready to be transmitted to a storage device or over a transmission medium for reception and decompression by a remotely located decoder. The MPEG standard specifies a particular syntax for a compressed bitstream. The MPEG video syntax comprises six layers, each of which supports either a signal processing function or a system function. The MPEG syntax layers correspond to a hierarchical structure. A "sequence" is the top layer of the video coding hierarchy and consists of a header and some number of "Groups-of-Pictures"(GOPs). The sequence header generally initializes the state of the decoder, which allows the decoder to decode any sequence without being affected by past decoding history. A GOP is a random access point, that is, it is the smallest coding unit that can be independently decoded within a sequence. A GOP typically consists of a header and some number of "pictures." The GOP header contains time and editing information. As discussed previously, there are four types of pictures: I-Pictures, P-Pictures, B-Pictures, and D-Pictures. Because of the picture dependencies, the order in which the pictures are transmitted, stored, or retrieved, is not the display order, but rather an order required by the decoder to properly decode the pictures in the bitstream. For example, a typical sequence of pictures, in display order, might be shown as follows: I B B P B B P B B P B B I B B P B B P 0 1 2 3 4 5 6 7 8 9 10 11 12 13 14 15 16 17 18

By contrast, the bitstream order corresponding to the given display order would be as follows: I P B B P B B P B B I B B P B B P B B 0 3 1 2 6 4 5 9 7 8 12 10 11 15 13 14 18 16 17

Because the B-Pictures depend on a subsequent I- or P-Picture in display order, the I- or P-Picture must be transmitted and decoded before the dependent B-Pictures.

Each of the "picture" portions of a GOP consists of a header and one or more "slices." The picture header contains time stamp, picture type, and coding information. A slice consists of an integral number of macroblocks from a picture and can be used by a video decoder to recover from decoding errors. If the bitstream becomes unreadable within a picture, the decoder will normally be able to recover by waiting for the next slice, without having to drop the entire picture. A slice also includes a header that contains position and quantizer scale information. "Blocks" are the basic coding unit, and the DCT is applied at this block level. Each block typically contains 64 component pixels arranged in an 8×8 order. The pixel values are not individually coded, but are components of the coded block. A macroblock is the basic unit for motion compensation and quantizer scale changes. As discussed previously, each macroblock consists of a header and six component 8×8 blocks: four blocks of luminance, one block of Cb chrominance, and one block of Cr chrominance. The macroblock header contains quantizer scale and motion compensation information.

VIDEO DECODING

The video decoding process is generally the inverse of the video encoding process and is employed to reconstruct a motion picture sequence from a compressed and encoded bitstream. The data in the bitstream is decoded according to a syntax that is itself defined by the data compression algorithm. The decoder must first identify the beginning of a coded picture, identify the type of picture, then decode each individual macroblock within a particular picture. If there are motion vectors and macroblock types (each of the picture types I, P, and B have their own macroblock types) present in the bitstream, they can be used to construct a prediction of the current macroblock based on past and future reference pictures that the decoder has already stored. Coefficient data is then inverse quantized and operated on by an inverse DCT process (IDCT) so as to transform the macroblock data from the frequency domain to data in the time and space domain.

After all of the macroblocks have been processed by the decoder, the picture reconstruction is complete. If a reconstructed picture is a reference picture (I-Picture), it replaces the oldest stored reference picture and is used as the new reference for subsequent pictures. As noted above, the pictures may also need to be re-ordered before they are displayed in accordance with their display order instead of their coding order. After the pictures are re-ordered, they may then be displayed on an appropriate output device.

PRIOR ART DECODING SCHEMES

In FIG. 1, there is shown a typical and conventional video decoding and display system illustrated in block diagram form. An encoded system bitstream, containing both video, audio, and other information, is typically written directly to a channel buffer 10 from a fixed rate channel 8. A synchronizer 12 receives the multiplexed system bitstream from the channel buffer 10 and pre-processes the system bitstream prior to its being input to a video decoder 14. Synchronization generally involves finding a unique pattern of bits, often termed sync codes or start codes, in the multiplexed system bitstream, and aligning the bitstream data following the sync code. The various groupings of bits making up the bitstream are often referred to as variable length symbols. These variable length symbols typically represent specific signal information in accordance with the syntax of the encoding and decoding algorithm employed, such as the MPEG standard.

In a conventional configuration, as illustrated in FIG. 1, the channel buffer 10 must have sufficient storage capacity to store the continuous stream of system bitstream data that is transmitted through the fixed rate channel 8. Also, the channel buffer 10 must have additional storage capacity to store bitstream data previously received from the fixed rate channel 8 that is temporarily buffered and awaiting eventual transfer to the synchronizer 12. At the appropriate time, the bitstream data stored in the channel buffer 10 is transferred to the synchronizer 12 and then to the video decoder 14. The video data component of the multiplexed system bitstream may then be decoded by the video decoder 14 and picture reconstruction subsequently performed. The video decoder 14 temporarily stores the pictures to be displayed for a period of time necessary for the decoder 14 to synchronize with the display controller 16. After synchronization between the video decoder 14 and the display controller 16 have been established, the display controller 16 must typically re-initialize to a state required to accept a subsequent reconstructed picture from the decoder 14. The display controller 16 then reads the frame to be displayed from the video decoder 14 for output to an appropriate output device 18.

It can be appreciated that processing delays associated with re-initializing the display controller 16 and synchronizing the display controller 16 with the video decoder 14 has the adverse affect of delaying further processing of bitstream data received from the fixed rate channel 8. During these periods of delay, the channel buffer 10 must accommodate the bitstream data being continuously received from the fixed rate channel 8 in order to prevent the loss of the incoming bitstream data. Moreover, these delays may result in the accumulation of additional frames which must be stored in the video decoder 14 while the display controller 16 re-initializes and synchronizes with the decoder 14. Thus, the processing delays inherent in a conventional video decoding scheme, as illustrated in FIG. 1, usually necessitate a substantial increase in the amount of memory allocated to both the channel buffer 10 and the video decoder 14.

It has been estimated that in a conventional television system, the time period required to synchronize the display controller 16 with the video decoder 14 is approximately 33 milliseconds. A time period of 33 milliseconds is roughly equivalent to the time it takes to display a single frame of video at a rate of 30 frames per second (National Television System Committee [NTSC] Standard display rate). Accordingly, the channel buffer 10 must have a memory capacity sufficient to accommodate the bitstream data received from the fixed rate channel 8 during this 33 millisecond delay. With a typical channel bit-rate of 8 megabits per second, the channel buffer 10 would have to store approximately 266 kilobits of excess bitstream data. It is anticipated that channel rates of 15 megabits per second may be appropriate in certain video decoding system configurations. At a channel rate of 15 megabits per second, the channel buffer 10 memory would have to be expanded to accommodate nearly 500 kilobits of additional bitstream data received from the fixed rate channel 8. Other processing delays, such as display controller 16 re-initialization, would result in the further accumulation of excess bitstream data in the channel buffer 10. The substantial increase in the amount of memory required to buffer this excess bitstream data in the channel buffer 10 during these processing delays would necessarily result in a significant increase in the size, complexity, and cost of the video decoding circuitry.

In view of the deficiencies inherent in conventional video decoding schemes discussed above, digital video signal transmission is still highly complex and expensive. Thus, there exists in the communications industry a keenly felt need to increase the efficiency of video decoders while minimizing both the complexity and cost of effective implementations. The present invention fulfills this need.

SUMMARY OF THE INVENTION

Broadly, and in general terms, one aspect of the present invention provides for an effective reduction in the amount of memory allocated to a channel buffer in a video decoding system by employing a novel channel buffer management scheme. Another aspect of the present invention provides for the efficient decoding, reconstructing, and displaying of video picture data received from a channel buffer. This increase in processing efficiency results in a substantial reduction in the amount of channel buffer memory needed to store a video bitstream received from a fixed rate transmission channel. In accordance with one aspect of the present invention, a video bitstream is input to a channel buffer at a constant, fixed transmission rate. The channel buffer preferably accumulates and accounts for the bits of data comprising a single picture of video information received from the video bitstream. It is understood that other data within the video bitstream may also be buffered in the channel buffer. After all of the bits comprising a single picture have been received in the channel buffer, the bits defining the picture are then transferred to a video decoder. The inventor has found that an effective reduction in the total allocation of channel buffer memory results from the immediate transfer of picture bits from the channel buffer to the decoder when all of the bits comprising a picture are received in the channel buffer.

Another aspect of the present invention involves the optimization of the picture decoding, reconstruction, and display operations of a video decoding system which immediately decodes the picture information received from a channel buffer. In one embodiment, the operation of a display controller is closely coupled to the picture reconstruction process. Picture reconstruction is further facilitated by a picture store which includes a plurality of picture memories, each of which is configured to store one reconstructed video frame or picture. Preferably, the display controller is instructed to remove or read a picture from the picture store while a subsequent picture is reconstructed and then transferred to the picture store. In another embodiment, a reconstructed portion of a picture is processed by the display controller while the remaining portion of the same picture is still being processed by the picture reconstruction unit. Orchestration of the picture reconstruction process with the display process has been found to significantly increase the efficiency of the video decoding process and allow the decoder to immediately read picture data from the channel buffer when the channel buffer is filled to a predetermined or expected capacity. The synchronized operation of the decoder, picture reconstruction unit, and display controller in accordance with the present invention provides a substantial reduction in the amount of required channel buffer memory to an amount approximately equal to the amount of memory necessary to store a minimum number of bits that defines the largest video picture type specified by the video compression algorithm in use.

Still another aspect of the novel channel buffer management scheme of the present invention concerns the fabrication of a video decoder, picture reconstruction unit, and display controller as a monolithic integrated circuit device. The reduction in the size and number of data and control paths between these components provides for a high level of synchronization between the decoding, picture reconstruction, and display processes of the present invention. Another aspect of the present invention concerns a microcontroller that monitors and regulates the video decoding processes implemented in the present innovation. The microcontroller preferably adjusts the processing rates of the decoder, picture reconstruction unit, and display controller to avoid any underflow or overflow of video bitstream data input to the channel buffer.

The novel features of the present invention will be better understood from the following detailed description, considered in connection with the accompanying drawings, wherein like numbers designate like elements. It should be expressly understood, however, that the drawings are for purposes of illustration and description only and are not intended as a definition of the limits of the present invention.

BRIEF DESCRIPTION OF THE DRAWINGS

FIG. 1 is a block diagram of a conventional video decoding scheme;

FIG. 4 is a flow diagram illustrating a process of computing the fullness criteria of a channel buffer in accordance with one embodiment of the present invention;

FIG. 6 illustrates a format of the output from a display controller in accordance with a standard video output format.

DETAILED DESCRIPTION OF THE PREFERRED EMBODIMENT

Figure 2:
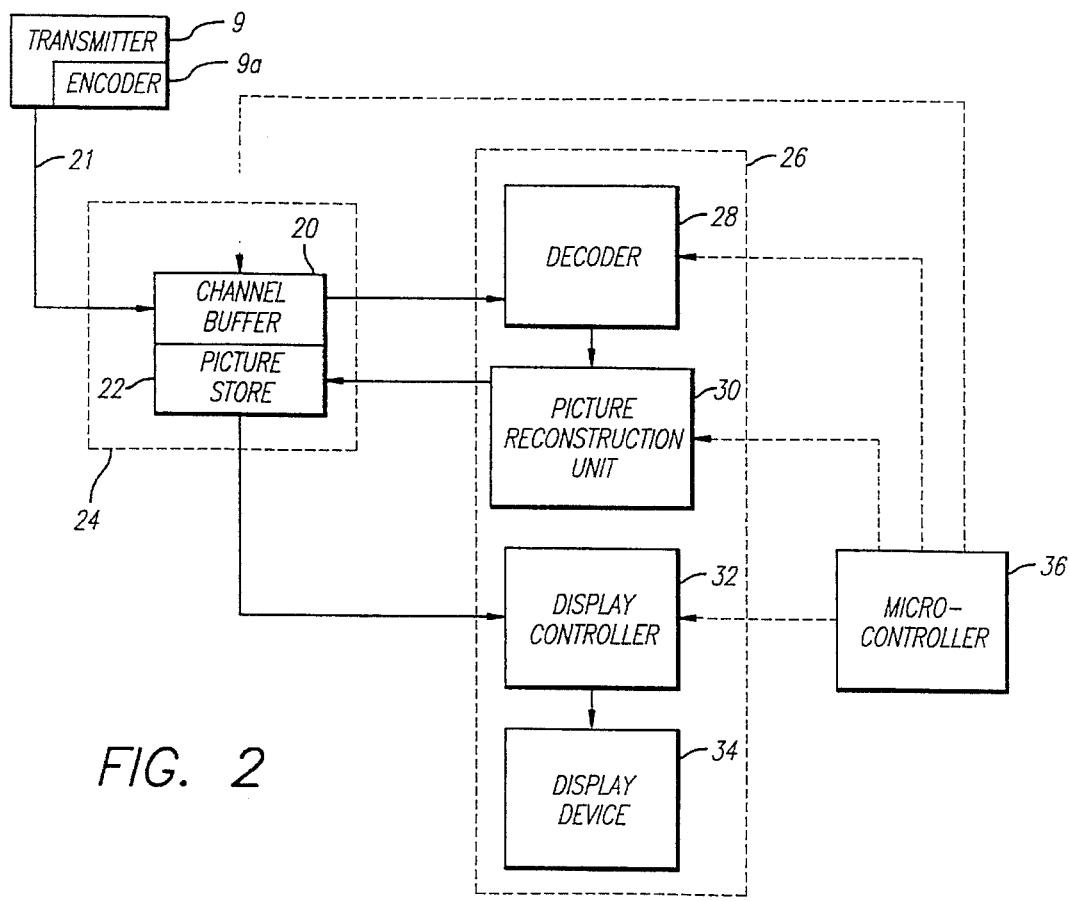
FIG. 2 is a block diagram of a novel channel buffer management scheme in accordance with one aspect of the present invention.

Referring to the figures, and more particularly to FIG. 2, there is shown a block diagram illustrating a novel channel buffer management scheme in accordance with one aspect of the present invention. In a preferred embodiment, an effective reduction in the amount of memory for the storage of bitstream data in the channel buffer 20 is realized by the employment of a novel picture reconstruction and display process performed by a picture reconstruction unit 30 and a display controller 32. In accordance with this aspect of the present invention, a video bitstream is input to the communication channel buffer 20 from a channel 21 for temporary storage therein. A transmitter 9 includes an encoder 9a for encoding video data in accordance with an MPEG standard to produce the video bitstream as including motion compensated pictures and Discrete Cosine Transform (DCT) encoded pictures, and transmits the video bitstream over the communication channel 21 to the channel buffer 20. When a predetermined amount of bitstream data is received in the channel buffer 20, the predetermined amount of data stored in the channel buffer 20 is transferred to, or read by, a video decoder 28. The immediate transfer of bitstream data from the channel buffer 20 to the video decoder 28 upon the channel buffer 20 reaching a predetermined capacity is made possible by a synchronized process of reconstructing and displaying decoded pictures in accordance with the present invention.

The video bitstream received by the channel buffer 20 from the channel 21 typically includes picture information that is representative of a plurality of single frames of motion video. Each encoded frame or picture of motion video is represented in digital form as a sequence of bits. The structure of this sequence of bits preferably conforms to a selected video compression standard, such as the MPEG standard for example. Information regarding the size of each picture within a video bitstream is normally encoded in the picture data or picture layer, and can be extracted and interpreted by the video decoding system. This bit size information represents the total number of bits that define a single encoded picture. The bit size of an encoded picture can be regarded as an expectation or prediction of the amount of memory needed to buffer the picture data in the channel buffer 20. The bit size of an encoded video picture can thus be used to determine the channel buffer 20 "fullness criteria."

In accordance with a preferred embodiment of the present invention, the picture information buffered in the channel buffer 20 is transferred to a decoder 28 when the channel buffer 20 is filled to an expected capacity. Preferably, the fullness criteria of the channel buffer 20 is satisfied when the total number of bits required to reconstruct a single picture have been received in the channel buffer 20. It should be understood that the channel buffer 20 fullness criteria can be computed using various methods. One such method involves extracting and reading the bit size data embedded in the encoded picture information. Another such method involves actively counting the picture bits defining a picture as the bits are received in the channel buffer 20.

After satisfying the channel buffer 20 fullness criteria, all of the bits defining the encoded picture are then transferred from the channel buffer 20 to the video decoder 28. The video decoder 28 then translates the encoded picture information into corresponding symbols or events. These symbols or events are subsequently used by the picture reconstruction unit 30 to reconstruct the original picture. In one embodiment, the picture reconstruction unit 30 includes two pipelines, an IDCT (Inverse Discrete Cosine Transform) pipeline and an MC (Motion Compensation) pipeline. Pipelining is a performance enhancement technique that enables several program instructions controlling the picture reconstruction process to be executed concurrently. Pipelining greatly reduces the total execution time of the picture reconstruction process. Preferably, the IDCT pipeline coordinates the reconstruction of each macroblock of a picture, and the MC pipeline processes any motion compensation information with respect to each macroblock. The output from the IDCT and MC pipelines are then merged to reconstruct an original picture. A microcontroller 36 preferably controls the pipelining and merging operations. The reconstructed picture is then transferred to a picture store 22 for temporary storage. A display controller 32, at the appropriate time, reads a picture from the picture store 22 and processes the picture in a format appropriate for an intended display device 34. Pictures stored in the picture store 22 are typically read by the display controller 32 at a rate roughly equivalent to the display rate of the display device 34. Two of the more prevalent display rates include 30 frames per second (NTSC Standard used in the United States) and 25 frames per second (Phase Altering Line [PAL]Standard used in much of Europe).

An important advantage of the present invention concerns the control of the display controller 32 in response to the state of the picture reconstruction unit 30 and video decoder 28. In one embodiment, a microcontroller 36 orchestrates the operations of the display controller 32, decoder 28, and the picture reconstruction unit 30. This orchestration or synchronization ensures that these components execute their respective tasks efficiently so that the picture data accumulating in the channel buffer 20 can be transferred to the decoder 28 immediately upon the satisfaction of the channel buffer 20 fullness criteria. A significant delay in any of the operations performed by a decoder, picture reconstruction unit, or a display controller will likely result in the accumulation of excess bitstream data in a channel buffer. Such an accumulation of excess bitstream data in the channel buffer will usually result in an overflow error condition which, in turn, causes the video decoding system to temporarily suspend all picture decoding activity. A conventional channel buffer management scheme typically avoids the aforementioned overflow error condition by significantly increasing the amount of memory in the channel buffer 10 beyond the amount of memory required for normal operation. This additional memory is dedicated primarily for storing excess bitstream data that accumulates in the channel buffer 10 when an overflow error occurs. The present invention, in contrast, provides for an effective and efficient management of the video decoding operations downstream of the channel buffer 20, which virtually eliminates the likelihood of overflow conditions from occurring. In normal operation, the present invention ensures that the picture data stored in the channel buffer 20 is transferred to the video decoder 28 upon the satisfaction of the channel buffer 20 fullness criteria. Thus, no dedicated "overflow" memory is required. The present invention therefore provides a significant reduction in the amount of memory required to buffer a video bitstream in a channel buffer 20 by eliminating the significant synchronizing and re-initializing delays inherent in conventional channel buffer management schemes.

Figure 3:
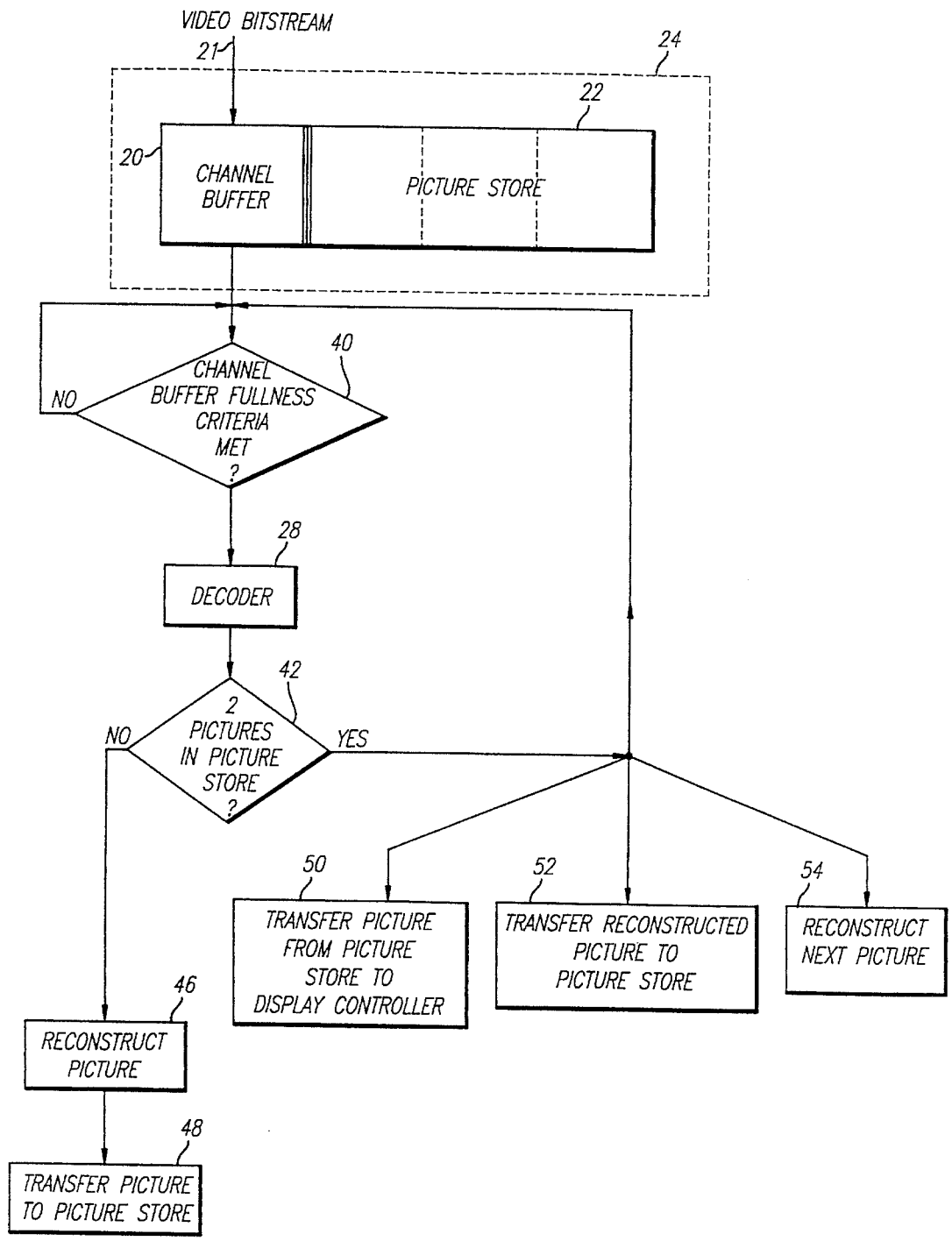
FIG. 3 is a flow diagram depicting the processes of a channel buffer management scheme in accordance with one embodiment of the present invention.

Another important aspect of the present invention concerns the efficient management of the channel buffer 20. The memory size of the channel buffer 20 is significantly reduced in one embodiment of the present invention by an optimization of the picture decoding, reconstruction, and display operations. Referring to FIG. 3, there is shown a flow diagram representative of the video decoding processes associated with a novel channel buffer management scheme in accordance with one embodiment of the present invention. A video bitstream, transmitted through a channel 21, is input to a channel buffer 20 for temporary storage. A unified memory 26 is preferably partitioned into at least two portions to accommodate the storage requirements of the channel buffer 20 and a picture store 22. As the fixed-rate video bitstream accumulates in the channel buffer 20, a computation is performed to determine the expected size of the picture currently buffered in the channel buffer 20, as at 40. The channel buffer 20 fullness criteria is preferably determined by computing the bit size of the picture in the channel buffer 20. Additionally, an actual count of the picture bits filling the channel buffer 20 is performed. When the actual count of the picture bits buffered in the channel buffer 20 is equivalent to the expected bit size of the picture, the fullness criteria is satisfied and all of the bits comprising the picture are read from the channel buffer 20 by the decoder 28.

In one embodiment of the present invention, the video bitstream input to the channel buffer 20 from a channel 21 conforms to an MPEG standard format. As illustrated in FIG. 4, the fullness criteria for a picture buffered in the channel buffer 20 is determined by reading a bit rate parameter (R) embedded in the sequence header of the video bitstream, as at 60. Also read is a delay parameter (Vbv Delay) from the picture header, as at 62. Each picture header contains a Vbv_Delay (Video Buffering Verifier) parameter that enables a video decoder to properly synchronize the processing rates of the picture decoding and the channel buffering operations. The Vbv_Delay parameter defines the time needed to fill the channel buffer 20 from an empty state to the correct capacity immediately before the decoder 28 reads all of the bits defining the picture from the channel buffer 20. This time is thus a delay period during which all of the bits comprising a picture are accumulated in the channel buffer 20. Typically, this delay time is measured in units of 1/90000 of a second. This number was selected because it is an exact multiple of several frame increments, 1/24, 1/25 and 1/30 for example, which conform to established standards for displaying film and video information. A computation of the total bits comprising a picture, as at 64, is made by multiplying the Vbv_Delay parameter by the bit rate (R) and dividing this quantity by 90,000 bits [Expected bits=Vbv_Delay * R/90,000 bits]. For example, if the value of Vbv_Delay is 9,000 and the value of R is 1.2 megabits per second, then the expected number of bits to be stored in the channel buffer 20 for the picture would be 120,000 bits.

A microcontroller 36 preferably performs the fullness criteria computation and also determines the actual number of picture bits that fill the channel buffer 20, as at 66. When the channel buffer 20 is filled to the expected capacity, all of the bits comprising the picture in the channel buffer 20 are transferred to the decoder 28, as at 68. It is to be understood that other methods of computing the expected and actual number of bits for a picture stored in the channel buffer 20 may be employed without departing from the scope of the present invention.

In another embodiment of the present invention, the picture store 22 is configured to include three picture memories, each of which is capable of storing the data of one reconstructed picture. A determination is made as to whether two of the three picture memories in the picture store 22 are occupied, as at 42. If two pictures are not currently stored in the picture store 22, the picture bits decoded by the decoder 28 are reconstructed into a corresponding picture by the picture reconstruction unit 30, as at 46. The reconstructed picture is then transferred to an available picture memory within the picture store 22, as at 48. If, however, two of the picture memories in the picture store 22 are occupied, the microcontroller 36 controls and synchronizes several specific decoding system operations in order to optimize the picture reconstruction and display processes. The microcontroller 36 preferably instructs the display controller 32 to read a picture out of the picture store 22, as at 50. A newly reconstructed picture is transferred to the picture store 22 from the picture reconstruction unit 30, as at 52. A previously decoded picture is then reconstructed by the reconstruction unit 30, as at 54. The synchronizing of the decoding, reconstruction, and displaying processes by the microcontroller 36 allows the decoder 28 to read the data of the picture being buffered in the channel buffer 20 immediately upon the satisfaction of the channel buffer 20 fullness criteria. Since the display controller 32 operations are closely coupled to the picture decoding and reconstruction processes, the appreciable synchronization and re-initialization delays associated with conventional decoding schemes are obviated.

Generally, the amount of unified memory 26 that is allocated to the picture store 22 is dependent on the type of picture being decoded and the applicable television broadcast system standard. In accordance with the NTSC Standard, for example, an I-Picture and a P-Picture each require an allocation of approximately 1,036,800 bits of picture store 22 memory. An NTSC type B-Picture will occupy approximately 388,800 bits of picture store 22 memory. Since the minimum amount of memory required to store a given picture type for a specified television broadcast standard is fixed, and the maximum number of pictures to be stored in the picture store 22 is fixed, any significant reduction in the total amount of memory utilized by a video decoding system can only be realized by minimizing the size of the channel buffer 20. A significant reduction in the size of the channel buffer 20 may be realized by employing the novel channel buffer 20 management scheme of the present invention.

In one embodiment of the present invention, the amount of unified memory 26 allocated to the channel buffer 20 is approximately two megabits of contiguous random access memory (RAM). In another embodiment, the unified memory 26 comprises a total of approximately four megabits of contiguous dynamic random access memory (DRAM), with approximately two megabits allocated to the picture store 22, and approximately two megabits allocated to the channel buffer 20. In this embodiment, the unified memory 26 is preferably configured to store 64-bit words in DRAM memory, and can be accessed over a 64-bit data bus to support image sizes up to approximately 352×288 pixels at a data rate of approximately 1.5 megabits per second. Accesses to the unified memory 26 are preferably performed in fast page mode to increase access efficiency. The interface of the frame store 22 is preferably configured for use with four 1-megabit DRAMs (four megabits of total memory).

In another embodiment, the unified memory 26 comprises 16 megabits of DRAM memory configured with a 64-bit data bus and optimized to operate at frame resolutions of up to 720×480 pixels at 30 frames per second (NTSC Standard) and 720×576 pixels at 25 frames per second (PAL Standard), and at a data rate of approximately 15 megabits per second. In this embodiment, the unified memory 26 is configured for use with four 4-megabit DRAMs (16 megabits of total memory). In an alternative embodiment, the microcontroller 36 may be programmed to vary the image resolution to accommodate decoding systems with different resolution and display characteristics. The microcontroller 36 may further be instructed to modify the partitioning of the unified memory 22, and the amount of unified memory 26 allocated to the channel buffer 20 and the frame store 22.

Figure 5:
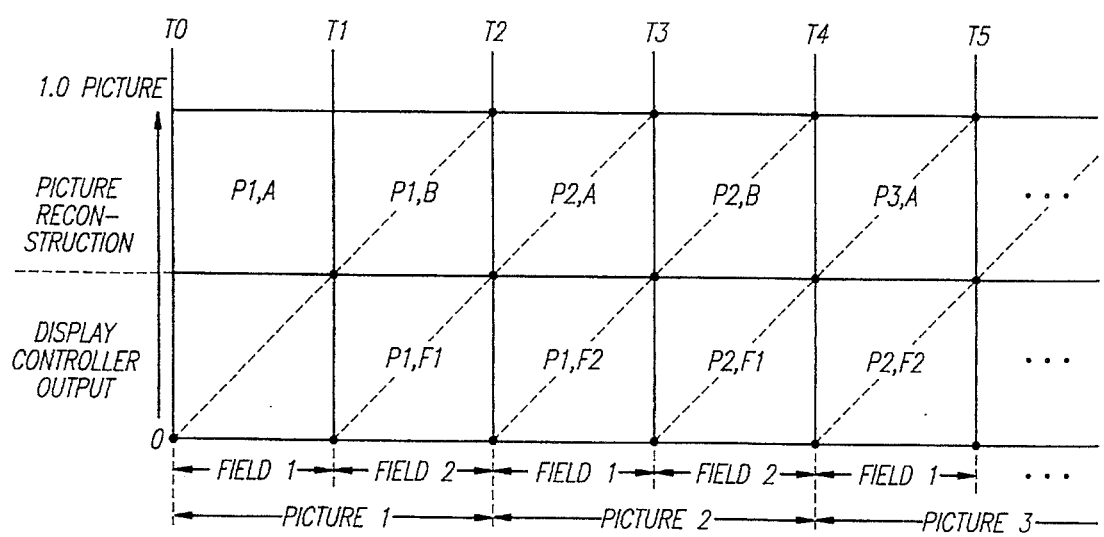
FIG. 5 is a graphic representation of the synchronized operations of a display controller and a picture reconstruction unit in accordance with the present invention.

Another important aspect of the present invention concerns the relationship between the reconstruction rate of the decoded picture information and the display rate of the reconstructed picture. Referring now to FIG. 5, a simplified and generalized graphical representation of this relationship is provided. In one embodiment, the rate of picture reconstruction is synchronized with the processing and display rate of the fields representative of the reconstructed picture information. It is noted that picture reconstruction progresses in frame order, and that the display of reconstructed picture information progresses in field order, such as in an interlaced format, as shown in FIG. 6, typically at twice the rate of picture reconstruction.

During a time period represented by T0-T1, a first portion of a first picture (P2,A) is processed by the picture reconstruction unit 30. Note that P1 represents a first picture, A and B represent portions of a picture, and F1 and F2 are the first and second fields representative of the reconstructed picture P1 information. At a time T2, the first picture has been fully reconstructed (P1,A+P1,B). At a time T1, during reconstruction of the picture P1, the display controller 32 initiates processing of a portion of the reconstructed picture P1. A first field F1 the representative of the reconstructed picture P1 is generated for output to an appropriate display device 34 at a time T2. Also at time T2, reconstruction of the next picture P2 is initiated. Concurrently with the reconstruction of the next picture P2, a second field (P1,F2) representative of the first picture P1 is generated and output by the display controller 32. This synchronized picture reconstruction and display process is then cautiously repeated for subsequent pictures and fields as further illustrated in FIG. 5. In one embodiment, after approximately 70 to 75 percent of a picture has been reconstructed, the display controller 32 begins reading and processing data for the picture from the picture store 22. It has been determined by the inventor that the amount of picture store 22 memory is minimized by synchronizing the rate of picture reconstruction with respect to the constant display rate of the display controller 32 in accordance with the present invention.

Since the reconstruction of a subsequent picture (P2) begins after outputting and displaying the first field (P1,F1) representative of a current picture (P1), the newly reconstructed data (P2,A) may overwrite the second field of the picture being displayed (P1,F2) if the reconstruction rate is too high. To prevent such overwriting from occurring, constant monitoring and adjusting of the reconstruction rate with respect to the constant display rate is preferably performed by a microcontroller 36. The status of the display controller 32 is analyzed by the microcontroller 36 which, in turn, communicates with the picture reconstruction unit 30 to regulate the rate of picture reconstruction. The closed-loop, dynamic regulation of the display controller 32 and picture reconstruction unit 30 processing rates by the microcontroller 36 thus optimizes the picture decoding/reconstruction/display process. This optimization directly results in a substantial reduction in the amount of memory required by the picture store 22 and the channel buffer 20. In one embodiment of the present invention, the picture store 22 is configured to store a maximum of three reconstructed pictures, and the channel buffer 20 is configured to accommodate the bit size of one encoded picture.

Another aspect of the present invention concerns the synchronization of the channel buffer 20 and display controller 32 operations. In some instances, variations in the system timebase can produce a drift between the channel 21 bitstream rate and the processing rate of the display controller 32. The system timebase establishes the presentation timing of the encoded pictures in the video bitstream. A video decoding system displays reconstructed pictures in the correct sequence and at the correct presentation time based on the system timebase information encoded in each picture. A drift or departure from the system timebase can cause the channel buffer 20 to periodically overflow or underflow if no corrective action is taken. In order to correct any such drift, the microcontroller 36 preferably increases or decreases the rate of the decoder 28, picture reconstruction unit 30, and display controller 32 by small amounts to correct for any timebase variations. Timebase correction may be achieved by advancing or delaying the vertical sync pulse by one or more scan lines. The microcontroller 36 instructs the display controller 32 to dynamically modify the display parameters which results in the addition or deletion of scan lines in the reconstructed picture. By properly balancing the processing rates of the channel buffer 20, decoder 28, picture reconstruction unit 30, and display controller 32, the microcontroller 36 can optimize the decoding and displaying of video pictures which, in turn, can eliminate any synchronization delays between the display controller 32 and the picture reconstruction unit 30. It should be understood that the display controller 32 can generate output video signals that conform to a variety of video formats, including interlaced and non-interlaced formats.

In a preferred embodiment, the decoder 28, picture reconstruction unit 30, and display controller 32 are fabricated on a monolithic integrated circuit 26. The inventor has determined that the close coupling of data and the control paths between the decoder 28, picture reconstruction unit 30, and display controller 32, and the elimination of printed circuit board interconnections provides for an effective regulation of the picture decoding, reconstruction, and display processes of the present invention, and an efficient management of the channel buffer 20. In one embodiment, a preferred IC package is a 208-pin MQUAD (Metal Quad Flat Pack) package. In another embodiment, a 160-pin PQFP (Plastic Quad Flat Pack) package may be employed.

It will, of course, be understood that various modifications and additions can be made to the preferred embodiments of the present invention discussed above without departing from the scope or spirit of the present invention. Accordingly, the scope of the present invention should not be limited by the particular embodiments discussed above, but should be defined only by the claims set forth below and equivalents thereof.

What is claimed is:

1. A Motion Picture Experts Group (MPEG) video data transmission system, comprising:

a transmitter including an encoder for encoding video data in accordance with an MPEG standard to produce an encoded video bitstream including motion compensated pictures and Discrete Cosine Transform (DCT) encoded pictures;

a communications channel for transmitting said video bitstream from the transmitter; and a receiver for receiving said video bitstream from the communications channel, the receiver including:

a buffer for temporarily storing said video bitstream;

a processor for processing said video bitstream and determining therefrom a number of bits in a picture being stored in the buffer;

a reconstruction unit for reconstructing said motion compensated pictures and said DCT encoded pictures; and a controller for causing said picture being stored in the buffer to be transferred from the buffer to the reconstruction unit when said number of bits of said video bitstream has been stored in the buffer.

2. A system as in claim 1, in which the reconstruction unit comprises a decoder which includes:

a motion pipeline for decoding said motion compensated pictures; and an Inverse Discrete Cosine Transform (IDCT) pipeline for decoding said DCT encoded pictures.

3. A system as in claim 1, in which:

the receiver further comprises a display unit for displaying said pictures; and the controller further synchronizes the buffer, the display unit and the reconstruction unit.

4. A system as in claim 3, in which the controller causes the display unit to display a first picture while the reconstruction unit reconstructs a second picture and the buffer stores a third picture.

5. A system as in claim 1, in which the processor comprises means for calculating said number of bits from data included in a header of said picture being stored in the buffer.

6. A system as in claim 5, in which said data comprises a bit rate parameter and a video buffering verifier delay parameter.

7. A system as in claim 1, in which the processor comprises means for determining said number of bits by counting bits of said video bitstream.

8. A Motion Picture Experts Group (MPEG) video data receiver for receiving a video bitstream which is encoded in accordance with an MPEG standard and includes motion compensated pictures and Discrete Cosine Transform (DCT) encoded pictures, the receiver comprising;

a buffer for temporarily storing said video bitstream;

a processor for processing said video bitstream and determining therefrom a number of bits in a picture being stored in the buffer;

a reconstruction unit for reconstructing said motion compensated pictures and said DCT encoded pictures; and a controller for causing said picture being stored in the buffer to be transferred from the buffer to the reconstruction unit when said number of bits of said video bitstream has been stored in the buffer.

9. A receiver as in claim 8, in which the reconstruction unit comprises a decoder which includes:

a motion pipeline for decoding said motion compensated pictures; and an Inverse Discrete Cosine Transform (IDCT) pipeline for decoding said DCT encoded pictures.

10. A receiver as in claim 8, further comprising a display unit for displaying said pictures, in which the controller further synchronizes the buffer, the display unit and the reconstruction unit.

11. A receiver as in claim 10, in which the controller causes the display unit to display a first picture while the reconstruction unit reconstructs a second picture and the buffer stores a third picture.

12. A receiver as in claim 8, in which the processor comprises means for calculating said number of bits from data included in a header of said picture being stored in the buffer.

13. A receiver as in claim 12, in which said data comprises a bit rate parameter and a video buffering verifier delay parameter.

14. A receiver as in claim 8, in which the processor comprises means for determining said number of bits by counting bits of said video bitstream.

* * * * *